P. SEWARD.

Wagon-Brake.

No. { 1,002. / 32,006. }

Patented Apr. 9, 1861.

Witnesses:
J W Coombs
R S Spencer

Inventor:
Porter Seward
per Munn & Co
Attorney

UNITED STATES PATENT OFFICE.

PORTER SEWARD, OF CHASEVILLE, NEW YORK.

WAGON-BRAKE.

Specification of Letters Patent No. 32,006, dated April 9, 1861.

*To all whom it may concern:*

Be it known that I, PORTER SEWARD, of Chaseville, in the county of Otsego and State of New York, have invented a new and Improved Wagon-Brake; and I do hereby declare that the following is a full, clear, and exact description thereof, reference being had to the accompanying drawings, in which—

Figure 1:
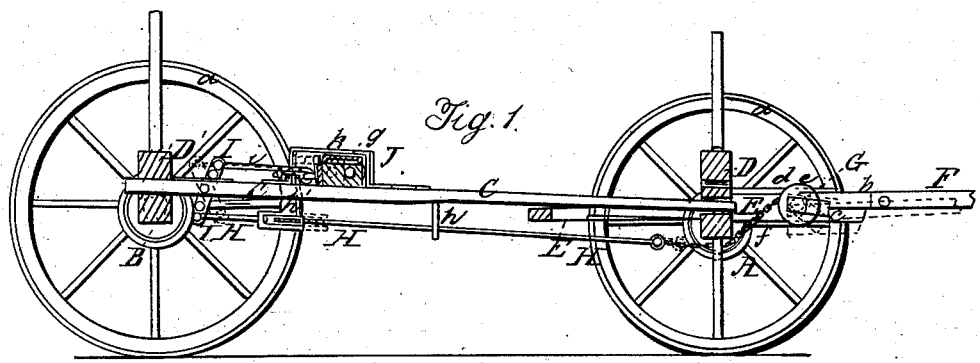
Figure 2:
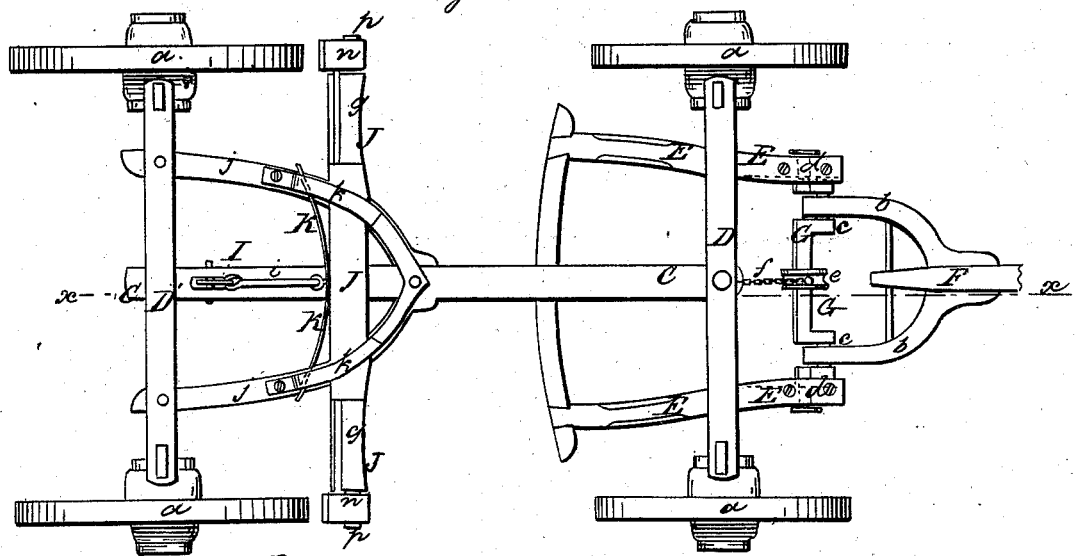
Figure 3:
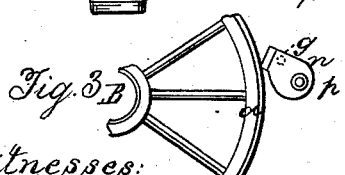

Figure 1. is a longitudinal section through a wagon, with my improved brake applied to it, taken in the vertical plane indicated by the red line *x. x.* in Fig. 2. Fig. 2. is a top view of a wagon having my improved brake applied to it. Fig. 3. is a view representing the position of one of the rubbers or brake blocks when the wagon is backed and the brakes are applied.

Similar letters of reference indicate corresponding parts in the three figures.

To enable those skilled in the art to make and use my invention, I will proceed to describe its construction and operation.

A, is the front axle, B, the hind axle, and C, the reach which connects them together; D, D', are the front and rear bolsters on which the wagon body (not represented in the drawings) is placed; E, E, are the hounds which are attached to the front axle, and *a, a, a, a,* are the wagon wheels on which the several parts are mounted. These parts just described are in common with an ordinary wagon and to this wagon I apply my improved automatic brake arrangement, in the following manner.

F, is the pole of the wagon which has two curved arms *b, b,* secured to its rear end. These arms *b, b,* are placed between the front ends of hounds E, E, and the ends of arms *b, b,* are attached to and have their bearings in cranks *c, c,* of a transverse crank bar G, which bar has its bearings in the ends of hounds E, E, which project from the outside of axle-tree A.

The cap pieces *d, d,* which are secured to the front ends of hounds E, E, over the ends inside edges of the hounds and prevent the of the crank bar G, project slightly over the cranks *c, c,* from being thrown above a horizontal plane, these cranks *c, c,* will thus be kept always in a position to be properly operated upon by the pole F.

In the middle of the crank bar G, between its two cranks *c, c,* is keyed a grooved pulley wheel *e,* which rocks with the crank bar G; and *f,* is a rope or chain attached to this pulley *e,* and passing over it, down, and under the axle tree A. This rope or chain *f,* extends back a suitable distance and connects with the front end of a rod H, which is continued back to a vertical lever I, and attached to the lower end of this lever I. This rod H, passes along under the reach bar C, and through a loop *h,* which projects down from this reach. A turn buckle *h',* is applied to rod H, for the purpose of lengthening or shortening it at pleasure.

The lever I, projects up through a slot near the rear end of reach bar C, and has its fulcrum in this reach. This lever I, may be provided with one or two extra holes for attaching the end of rod H, closer to the fulcrum of said lever.

The upper end of lever I, projects above the top of reach C, and is connected to the middle of brake bar J, by a short link *i*. This horizontal transverse bar J, rests on the reach bar C, and on two curved brace arms *j, j,* which form a part of the reach; and the ends of this brake bar project out on each side of the reach C, as far as the inside surfaces of the rear wheels *a, a,* as represented in Fig. 2, and in front of these wheels. This bar J, is held down on the reach by the metal straps *k, k,* which allow the bar J, to move bodily in a direction with the length of the wagon.

K, is a semi elliptic spring which is secured at the middle of its length to the middle of the brake bar J, and to the back edge of this bar. The ends of spring K bear against the inside surfaces of the rear perpendicular portions of straps *k, k,* and force the bar forward to relieve the rubbers from the wheels.

*g, g,* are two stiff steel rods which are secured at their inner ends by staples, or in any suitable manner to the top of brake bar J. The outer ends of these rods *g, g,* are secured to the rear ends of rubber blocks *n, n,* the front ends of which blocks are pivoted to the ends of the brake bar J, at *p, p,* Figs. 2 and 3. The blocks *n, n,* will thus be allowed to rock on the pivots *p, p,* and it will be seen that when the rear ends of the rubbers are brought into contact with the peripheries of the wheels *a, a,* and the wagon is backed while they thus bear upon the wheels, the steel rods *g, g,* will be twisted and allow the ends of the rubbers to rise and release themselves from the wheels. As soon as the backing ceases the rods *g, g,* will force the rubbers or rubber blocks $n, n$, back to their original position. The rear end of these blocks $n, n$, are covered with sole leather in the usual manner to prevent the blocks from wearing away.

The operation of applying the brakes is as follows: The horses are hitched to the pole F, in the usual manner, and when the wagon is drawn along the crank $c, c$, together with all the parts which make up my improved brake, are held in the positions represented in Figs. 1 and 2, in black lines. When it is desired to apply the brakes to the wheels on a level road the horses are checked and the pole is consequently moved backward. This operation of the pole forces down the cranks $c, c$, turns the crank shaft G, and with it the pulley wheel $e$, in the direction indicated by the arrows in Figs. 1 and 2, thus causing the pulley $e$, to wind up the chain $f$, and draw the rod H, together with the lower end of lever I, forward. The upper end of lever I, is consequently moved backward with some force and this latter end of the lever I, being connected to the transverse brake bar J, this bar J, will be moved back and the rear ends of the blocks $u, u$, will be drawn up hard against the peripheries of the rear wheels $a, a$. In going down a grade, the horses being properly checked, the brakes will be applied in the same manner as just described. When the horses are started and the pole F, drawn forward the spring K, will throw the bar J, forward and release the brakes from the wheels. In backing the wagon under a very heavy load the blocks $n, n$, will be thrown up by the friction of the wheels upon their surfaces, as herein above explained, and thus released from the wheels in such a manner, as not to prevent the wagon from being moved readily.

Having thus described my invention, what I claim as new and desire to secure by Letters Patent, is;

The arrangement of the crank G, pulley $e$, chain $f$, and adjustable rod H, with the draft pole F, lever I, spring K, brake bars J, J, rods $g, g$, and pivoted rubbing blocks $n, n$, all in the manner and for the purposes herein shown and described.

PORTER SEWARD.

Witnesses:
JOHN B. SEWARD,
S. H. GURNEY.